Feb. 20, 1923.                                1,445,979.
F. W. STOLTJE.
DEMOUNTABLE SPRING TIRE.
FILED DEC. 13, 1922.
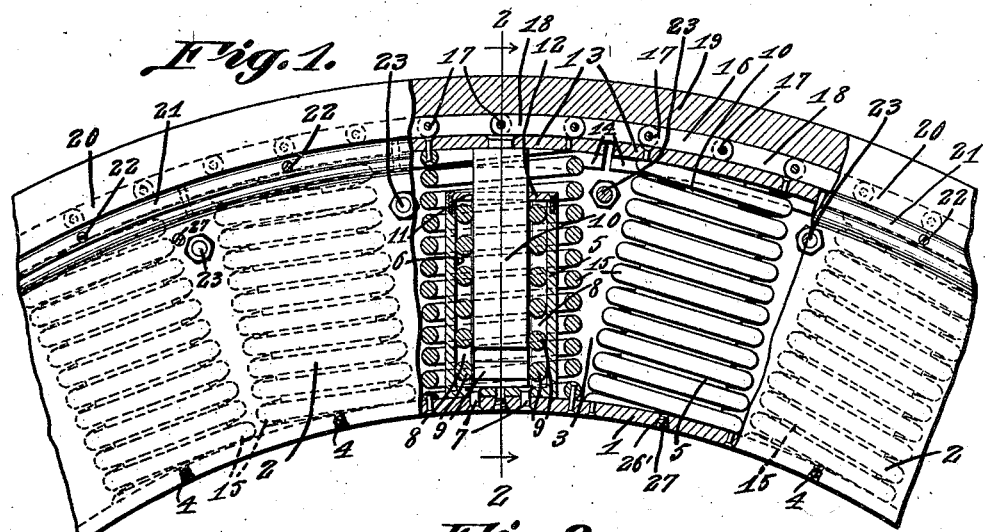
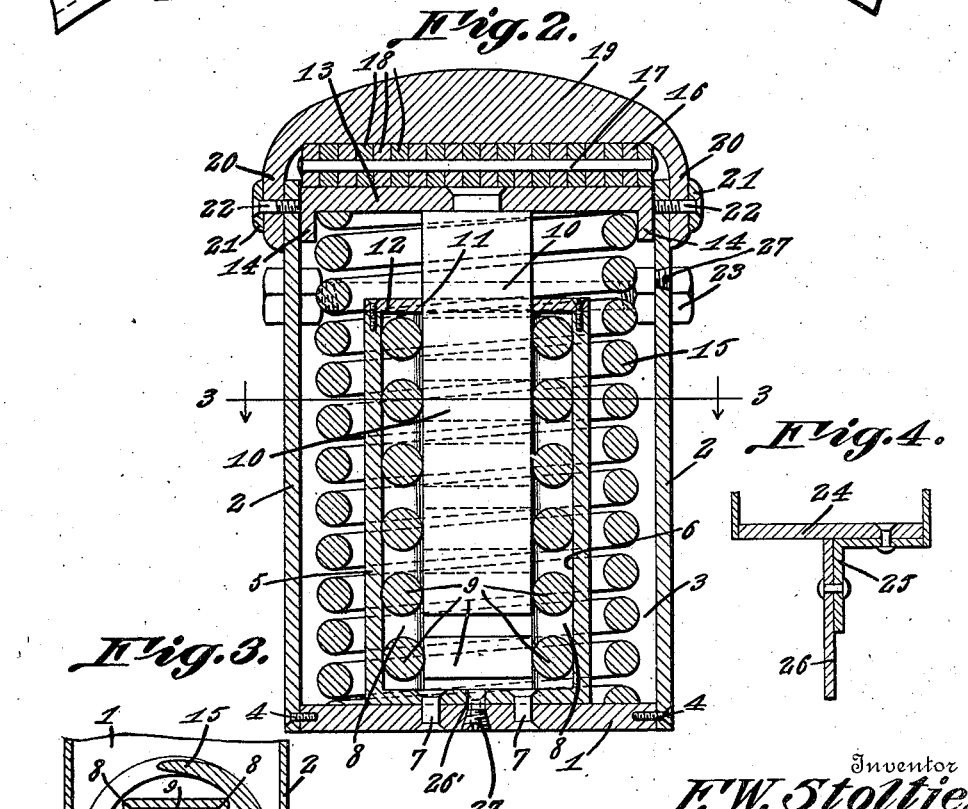
Inventor
F. W. Stoltje,
By C. A. Snow & Co.
Attorneys Patented Feb. 20, 1923.

1,445,979

UNITED STATES PATENT OFFICE.

FRANK W. STOLTJE, OF HOUSTON, TEXAS.

DEMOUNTABLE SPRING TIRE.

Application filed December 13, 1922. Serial No. 606,694.

*To all whom it may concern:*

Be it known that I, FRANK W. STOLTJE, a citizen of the United States, residing at Houston, in the county of Harris and State of Texas, have invented a new and useful Demountable Spring Tire, of which the following is a specification.

This invention relates to spring tires for vehicle wheels, one of its objects being to provide a demountable tire of this character which is compact in construction, and is capable of yielding so as to absorb shocks as efficiently as does the ordinary cushioned or pneumatic tire.

Another object is to provide a tire of this character having a flexible tread which will ride over obstructions easily, the working parts of the tire being fully protected from dust and moisture and adapted to hold a suitable lubricant to insure smooth action.

A still further object is to provide a tire, the parts of which can be reached conveniently for the purpose of repairing or replacing them.

Another object is to provide a tire of this character utilizing a flexible tread that can be renewed as desired.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as claimed.

In the accompanying drawings the preferred form of the invention has been shown.

In said drawings

Figure 1 is a view partly in side elevation and partly in section of a portion of the tire.

Figure 2 is an enlarged section on line 2—2, Figure 1.

Figure 3 is a section, on a reduced scale, on line 3—3, Figure 2.

Figure 4 is a section through a modified structure showing the means employed for attaching the tire to a disk wheel.

Referring to the figures by characters of reference 1 designates a continuous circular rim to the sides of which are secured rings 2 cooperating with the rim to provide an annular channel 3. The side rings are attached to the rim 1 by machine screws, bolts or other suitable fastening means indicated generally at 4.

Secured to the rim 1 at regular intervals are rectangular blocks 5 having rectangular recesses 6, these blocks being attached to the rim preferably by rivets 7 extending through the bottoms or inner ends of the blocks and through the rim. In the corners of each recess 6 are located bearing strips 8 in which are journaled the necks of antifriction rollers 9 arranged in series, each series being parallel with one of the walls of the recess. Thus the rollers will engage the four sides of a shank 10 rectangular in cross section and which is mounted to work in and out within the recess 6. This shank is slidable within an opening 11 formed in a cover plate 12 secured to the outer end of the block 5 and serving to retain the strips 8 and rollers 9 within the recess. The outer end of the shank 10 is secured to a short segmental backing plate 13 having side flanges 14 extending inwardly therefrom. The sides of the plate fit snugly against the inner faces of the side rings 2 and are adapted to slide thereon. Plate 13 bears against one end of a coiled spring 15 the other end of which bears against the rim 1, this spring extending around the block 5 as shown.

It is to be understood that each of the blocks 5 is provided with rollers, a spring and a shank as described and the segmental plates on all of the shanks are spaced apart slightly at their ends so as to be capable of moving inwardly relative to each other. They normally define a circle, however and all press against an endless chain 16. This chain consists of flexible transverse pivot pins 17 engaging the end portions of short narrow links 18, the ends of the links being disposed close together, as shown in Figure 2 and all of the links forming a broad chain or belt of approximately the same width as the plates 13.

Fitted over the chain or belt 16 is the flexible tread portion or casing 19 of the tire. This can be formed of any suitable material and has side aprons 20 lapping and secured to the sides of the rings 2. Holding rings 21 bear against the outer sides of the aprons 20 and are clamped to the aprons by bolts 22 extending through the aprons and into the rings 2. For the purpose of reinforcing the structure, tie bolts 23 are secured to the side rings and extend between the springs 15.

It is to be understood that a spring tire such as herein described can be placed on the ordinary wheel and used in lieu of the ordinary demountable rim and tire. When in use the tread portion thereof will provide the desired degree of resiliency, the shocks being absorbed by the springs 15 and being distributed through the chain or belt to two or more of the plates 13 and their springs.

If the tire is to be used on a disk wheel the rim portion of the tire, shown at 24 in Figure 4, will be provided with an angle ring 25 which can be held by rivets or the like to the disk wheel 26.

It will be seen that a spring tire such as described is compact in construction and dust proof. To facilitate the proper operation of the parts openings 26 can be provided where desired and a suitable lubricant directed into the tire structure therethrough. These openings can be closed by screw plugs 27 or the like.

What is claimed is:—

1. A spring tire including a rim, side plates cooperating therewith to form an annular channel, spaced recessed members secured to the rim and within the channel, antifriction devices in the recesses, segmental backing plates, shanks extending therefrom and slidable in the recesses, an endless chain or belt contacting with and extending circumferentially of the plates, springs in the channels and bearing against the plates to hold the chain taut, a casing extending along the belt and forming the tread portion of the tire, and aprons at the sides of the casing secured to the side rings.

2. A spring tire including a rim, side rings thereon, recessed members secured to the rim, a shank slidable in each member, antifriction devices in the recesses and engaging the shanks, coiled springs extending around said members, backing plates bearing against the respective springs and secured to the respective shanks, an endless chain belt engaging and normally held taut by the plates, and a casing extending over and in contact with the belt and secured to the side rings.

3. A spring tire including a rim, side rings thereon, recessed members secured to the rim, a coiled spring extendng around each member, a shank in each member, antifriction devices in each member for centerfriction the shank therein, backing plates bearing against the respective springs and secured to the respective shanks, a transversely and longitudinally flexible chain belt engaging and normally held taut by the backing plates, and a casing extending over the belt and detachably secured to the side rings.

In testimony that I claim the foregoing as my own, I have hereto affixed my signature in the presence of two witnesses.

FRANK W. STOLTJE.

Witnesses:
I. E. SIMPSON,
HUBERT D. LAWSON.